(12) United States Patent
Kanno et al.

(10) Patent No.: US 10,541,443 B2
(45) Date of Patent: Jan. 21, 2020

(54) LITHIUM SOLID ELECTROLYTE

(71) Applicants: TOKYO INSTITUTE OF TECHNOLOGY, Tokyo (JP); TOYOTA JIDOSHA KABUSHIKI KAISHA, Toyota-shi, Aichi-ken (JP)

(72) Inventors: Ryoji Kanno, Tokyo (JP); Yuki Inoue, Tokyo (JP)

(73) Assignees: Tokyo Institute of Technology, Tokyo (JP); Tokyo Jidosha Kabushiki Kaisha, Aichi-ken (JP)

( * ) Notice: Subject to any disclaimer, the term of this patent is extended or adjusted under 35 U.S.C. 154(b) by 136 days.

(21) Appl. No.: 15/742,563

(22) PCT Filed: Jul. 8, 2016

(86) PCT No.: PCT/JP2016/070331
§ 371 (c)(1),
(2) Date: Jan. 8, 2018

(87) PCT Pub. No.: WO2017/007030
PCT Pub. Date: Jan. 12, 2017

(65) Prior Publication Data
US 2018/0205116 A1 Jul. 19, 2018

(30) Foreign Application Priority Data
Jul. 9, 2015 (JP) ................................. 2015-138029

(51) Int. Cl.
*H01M 10/0562* (2010.01)
*H01M 10/052* (2010.01)
(Continued)

(52) U.S. Cl.
CPC ......... *H01M 10/0562* (2013.01); *C01B 25/14* (2013.01); *H01B 1/10* (2013.01);
(Continued)

(58) Field of Classification Search
CPC ...... H01M 4/64; H01M 4/60; H01M 10/0562; H01M 10/052
See application file for complete search history.

(56) References Cited

U.S. PATENT DOCUMENTS 6,277,524 B1 * 8/2001 Kanno .................... C03C 3/321
429/304
2006/0246355 A1 * 11/2006 Min ...................... H01M 2/145
429/322

(Continued)

FOREIGN PATENT DOCUMENTS

JP   2002-109955 A    4/2002
JP   2013-211171 A   10/2013
(Continued)

OTHER PUBLICATIONS

Ryoji Kanno et al., "Lithium Ionic Conductor Thio-LISICON The $Li_2S$—$GeS_2$—$P_2S_5$ System," Journal of the Electrochemical Society, 148 (7) A742-A746 (2001).

(Continued)

*Primary Examiner* — Kenneth J Douyette
(74) *Attorney, Agent, or Firm* — Finnegan, Henderson, Farabow, Garrett & Dunner, LLP (57) ABSTRACT

(Problem to be Solved) A solid electrolyte material with favorable ion conductivity is demanded from the viewpoint of the higher output of a battery. The present invention was made in view of the above-described problems, with an object of providing a sulfide solid electrolyte material with favorable Li ion conductivity and providing a lithium battery including the sulfide solid electrolyte material. (Solution) There are provided: a solid electrolyte including a sulfide-based solid electrolyte represented by a composition formula: $(Li_2S)_x(MS_2)_y(P_2S_5)_z$, in which M is at least one selected from the group consisting of Ge, Sb, Si, Sn, B, Al, Ga, In, Zr, V, and Nb, and $0.53 \leq x \leq 0.74$, $0.13 \leq y \leq 0.37$, $0.04 \leq z \leq 0.15$, and $x+y+z=1$ are satisfied; and a lithium battery including the solid electrolyte.

4 Claims, 6 Drawing Sheets

(51) Int. Cl.
*H01M 4/64* (2006.01)
*C01B 25/14* (2006.01)
*H01B 1/10* (2006.01)
*H01M 4/02* (2006.01)

(52) U.S. Cl.
CPC ........... *H01M 4/64* (2013.01); *H01M 10/052* (2013.01); *H01M 2004/027* (2013.01); *H01M 2004/028* (2013.01); *H01M 2300/0065* (2013.01); *H01M 2300/0068* (2013.01)

(56) References Cited

U.S. PATENT DOCUMENTS

| | | |
|---|---|---|
| 2013/0040208 A1 | 2/2013 | Kanno et al. |
| 2016/0197374 A1 | 7/2016 | Kato |

FOREIGN PATENT DOCUMENTS

| | | |
|---|---|---|
| JP | 2015-69696 | 4/2015 |
| WO | WO2011/118801 A1 | 9/2011 |

OTHER PUBLICATIONS

Noriaki Kamaya et al., "A Lithium Superionic Conductor," Nature Materials, vol. 10, Sep. 2011, Advanced online publication, Jul. 31, 2011, DOI:10.1038/NMAT3066 pp. 682-686.
Office Action issued in Japanese patent application No. 2015-138029 dated Jan. 8, 2019.
Office Action issued in Chinese Application No. 201680040131.X dated Sep. 3, 2019.

\* cited by examiner

LITHIUM SOLID ELECTROLYTE

CROSS-REFERENCE TO RELATED APPLICATIONS

This application is a national phase application of International Application No. PCT/JP2016/070331, filed Jul. 8, 2016, and claims the priority of Japanese Application No. 2015-138029, filed Jul. 9, 2015, the content of both of which is incorporated herein by reference.

TECHNICAL FIELD

The present invention relates to a lithium solid electrolyte with favorable ion conductivity and to a lithium battery including the solid electrolyte.

BACKGROUND ART

With the rapid spread of information-related and communication apparatuses such as personal computers, video cameras, and mobile phones in recent years, the development of batteries utilized as power supplies for the apparatuses has been regarded as important. The development of high-output and high-capacity batteries for electric or hybrid vehicles has also been pursued in the automobile industry and the like. Among the various batteries, lithium batteries currently attract attention from the viewpoint of having high energy densities.

In currently commercially available lithium batteries, electrolytic solutions including flammable organic solvents are used, and therefore it is preferable to attach safety devices that inhibit temperature from increasing in the event of a short circuit and to improve structures and materials for preventing a short circuit. In contrast, all-solid-state lithium batteries in which solid electrolyte layers are used instead of electrolytic solutions are considered to allow the simplification of safety devices and to be excellent in production cost and productivity because any flammable organic solvent is not used in the batteries.

Sulfide solid electrolyte materials are known as solid electrolyte materials used in all-solid-state lithium batteries. For example, Non Patent Literature 1 discloses a Li ion conductor (sulfide solid electrolyte material) having a composition of $Li_{(4-x)}Ge_{(1-x)}P_xS_4$. Patent Literature 1 discloses an LiGePS-based sulfide solid electrolyte material having a high ratio of crystal phase having a specific peak in X-ray diffraction measurement. In addition, Non Patent Literature 2 discloses an LiGePS-based sulfide solid electrolyte material.

CITATIONS LIST

Patent Literature

Patent Literature 1: International Publication No. WO 2011/118801

Non Patent Literature

Non Patent Literature 1: Ryoji Kanno et al., "Lithium Ionic Conductor Thio-LISICON The Li2S-GeS2-P2S5 System", Journal of The Electrochemical Society, 148 (7) A742-A746 (2001)

Non Patent Literature 2: Noriaki Kamaya et al., "A lithium superionic conductor", Nature Materials, Advanced online publication, 31 Jul. 2011, DOI: 10.1038/NMAT3066

SUMMARY OF INVENTION

Technical Problem

A solid electrolyte material with favorable ion conductivity is demanded from the viewpoint of the higher output of a battery. The present invention was made in view of the above-described problems, with an object of providing a sulfide solid electrolyte material with favorable Li ion conductivity.

Non Patent Literature 1 and Patent Literature 1 examine a composition of $Li_{(4-x)}Ge_{(1-x)}P_xS_4$. Non Patent Literature 2 examines $Li_{10}GeP_2S_{12}$ (LGPS) which exhibits a high ion conductivity of 12 mS cm$^{-1}$ equivalent to the ion conductivity of an electrolytic solution and which is a system found in a composition of $Li_{3.35}Ge_{0.35}P_{0.65}S_4$. The sulfide solid electrolyte materials, which are solid-solution systems of $Li_4GeS_4$ and $Li_3PS_4$, include compositions with relatively high Li contents. An object of the present invention is to provide a sulfide solid electrolyte material that includes a composition in which the content of Li is less than those in the conventional technologies and that has favorable Li ion conductivity.

Still another object of the present invention is to provide a lithium battery including the sulfide solid electrolyte material.

Solution to Problem

The following solutions to the problems described above are provided by the present invention.

[1] A solid electrolyte including a sulfide-based solid electrolyte represented by a composition formula: $(Li_2S)_x(MS_2)_y(P_2S_5)_z$, wherein M is at least one selected from the group consisting of Ge, Sb, Si, Sn, B, Al, Ga, In, Zr, V, and Nb; and $0.53 \leq x \leq 0.74$, $0.13 \leq y \leq 0.37$, $0.04 \leq z \leq 0.15$, and $x+y+z=1$ are satisfied.

[2] The solid electrolyte according to [1], wherein at least some of the sulfide-based solid electrolytes include characteristic peaks at at least diffraction angles (2θ) in the vicinities of 15.9°, 18.3°, 25.9°, 30.4°, 31.8°, 40.3°, 41.3°, 45.5°, and 48.4° in powder X-ray diffractometry with a Cu-Kα ray having an X-ray wavelength of 1.5418 Å.

[3] A lithium battery including the solid electrolyte according to [1] or [2].

Advantageous Effects of Invention

According to the present invention, the sulfide solid electrolyte material is provided that includes a composition in which the content of Li is lower than those in conventional technologies and any halogen element with low stability is not included, and that has favorable Li ion conductivity and excellent electrochemical stability. In addition, the sulfide solid electrolyte material includes an argyrodite type structure which is stable at room temperature. There is also provided the lithium battery including the sulfide solid electrolyte material.

DESCRIPTION OF EMBODIMENTS

A sulfide solid electrolyte material of the present invention and a lithium battery including the sulfide solid electrolyte material will be described in detail below. However, the present invention is not limited to embodiments described below.

As a result of intensive examination, the present inventor found that a solid electrolyte including a sulfide-based solid electrolyte represented by a composition formula: $(Li_2S)_x(MS_2)_y(P_2S_5)_z$, in which M is at least one selected from the group consisting of Ge, Sb, Si, Sn, B, Al, Ga, In, Zr, V, and Nb, and $0.53 \le x \le 0.74$, $0.13 \le y \le 0.37$, $0.04 \le z \le 0.15$, and $x+y+z=1$ are satisfied, has a high ion conductivity, and arrived at the present invention.

(Sulfide-Based Solid Electrolyte)

The sulfide-based solid electrolyte of the present invention will be described with reference to the ternary composition diagram of an $Li_2S$-$MS_2$-$P_2S_5$ of FIG. 1. The points "●" in FIG. 1 indicate the compositions of examples described later, the points "■" indicate the compositions of comparative examples described later, and the points "▲" indicate the compositions of the sulfide-based solid electrolytes described in the above Citation List and the like. A chain line connecting $Li_4GeS_4$ and $Li_3PS_4$ is a line of a $Li_4GeS_4$—$Li_3PS_4$ solid-solution system, and the compositions of the conventionally reported sulfide-based solid electrolytes are located above the line and proved to have a relatively high Li content.

The sulfide-based solid electrolyte of the present invention includes a composition represented by $(Li_2S)_x(MS_2)_y(P_2S_5)_z$, in which M is at least one selected from the group consisting of Ge, Sb, Si, Sn, B, Al, Ga, In, Zr, V, and Nb, and $0.53 \le x \le 0.74$, $0.13 \le y \le 0.37$, $0.04 \le z \le 0.15$, and $x+y+z=1$ are satisfied. When the composition of the solid electrolyte is within the above range, the solid electrolyte having an excellent ion conductivity can be obtained.

Figure 1:
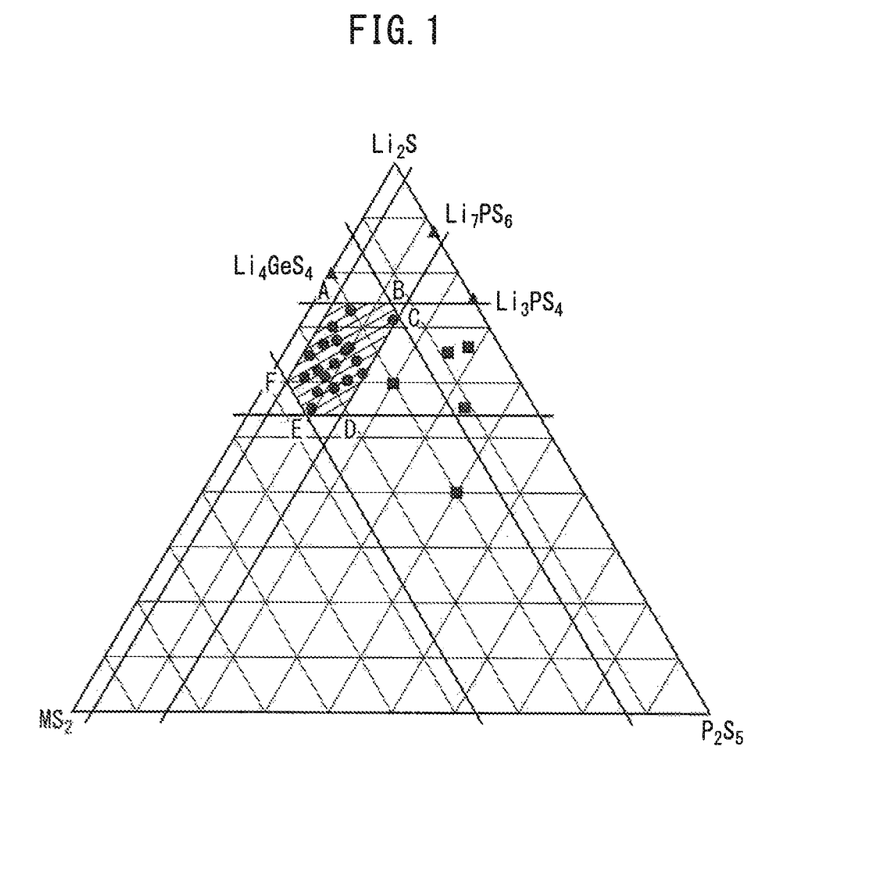
FIG. 1 is a ternary composition diagram of an $Li_2S$-$MS_2$-$P_2S_5$ system illustrating the composition range of a sulfide-based solid electrolyte of the present invention.

In the ternary composition diagram of the $Li_2S$-$MS_2$-$P_2S_5$ system of FIG. 1, the range in which $0.53 \le x \le 0.74$, $0.13 \le y \le 0.37$, $0.04 \le z \le 0.15$, and $x+y+z=1$ are satisfied is a range enclosed by line segments represented by reference characters A, B, C, D, E, and F. The compositions located above the line of the $Li_4GeS_4$—$Li_3PS_4$ solid-solution system are known as conventional technologies. However, the solid electrolyte of the present invention has a composition range below the line and can have a lower Li content than the Li contents in the conventional technologies.

M included in the composition is at least one selected from the group consisting of Ge, Sb, Si, Sn, B, Al, Ga, In, Zr, V, and Nb. The actual adoption of Ge has been reported as a conventional technology. According to the present invention, however, M is not limited to Ge. Because Ge is relatively expensive, the possible selection of the elements other than Ge is advantageous in terms of cost. Further, the composition of the present invention includes no halogen element. Since halogen elements have low stability, the inclusion of no halogen element results in improvement in the stability of the solid electrolyte of the present invention.

The solid electrolyte in the composition range includes an argyrodite type phase at a high rate. The argyrodite type phase is a phase observed in a high ion-conductive $Li_7PS_6$ known as a conventional technology. While not wishing to be bound by any particular theory, the inclusion of the argyrodite type phase at a high rate into the solid electrolyte is considered to contribute to the high ion conductivity of the solid electrolyte.

Figure 2:
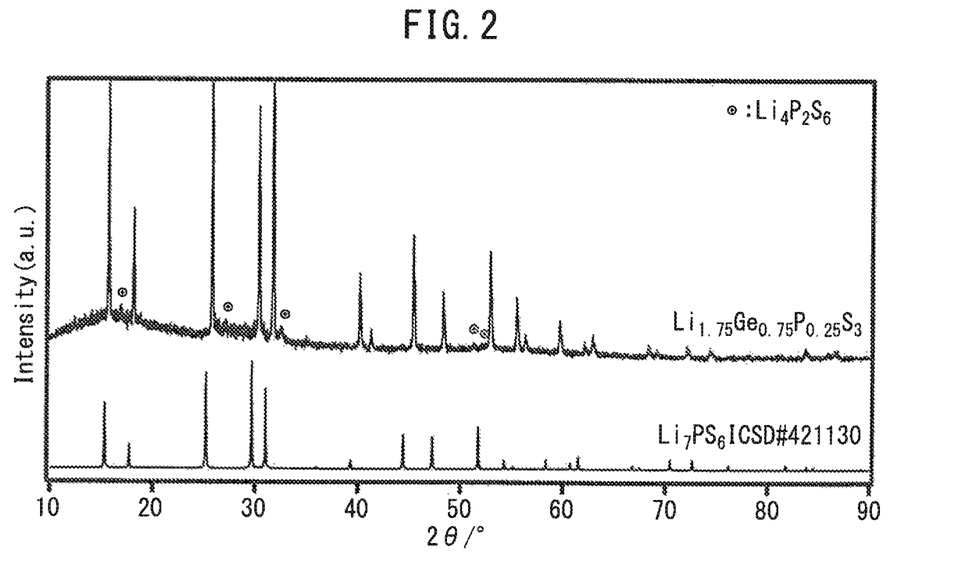
FIG. 2 illustrates the X-ray diffraction pattern of a solid electrolyte including an argyrodite phase of the present invention (example and reference example).

The argyrodite type phase exhibits characteristic peaks in X-ray diffraction measurement. FIG. 2 illustrates X-ray diffraction spectra providing a comparison between a sulfide solid electrolyte material of the present invention and an argyrodite type sulfide solid electrolyte material of a conventional technology. Both exhibit similar peaks, and the sulfide solid electrolyte material of the present invention includes an argyrodite type phase at a high rate.

More specifically, at least some of the sulfide solid electrolyte materials of the present invention include characteristic peaks at at least diffraction angles ($2\theta$) in the vicinities of 15.9°, 18.3°, 25.9°, 30.4°, 31.8°, 40.3°, 41.3°, 45.5°, and 48.4° in powder X-ray diffractometry with a Cu-Kα ray having an X-ray wavelength of 1.5418 Å. At least some of the sulfide solid electrolyte materials of the present invention include an argyrodite type phase at a high rate, as judged by the diffraction angles ($2\theta$) of the characteristic peaks. An argyrodite type phase observed in $Li_7PS_6$ known as a conventional technology was confirmed at 210° C. or more, whereas an argyrodite type crystal structure observed in the sulfide solid electrolyte material of the present invention was confirmed at room temperature. In other words, the argyrodite type phase observed in the present invention is stable at room temperature.

A method of producing the solid electrolyte of the present invention will be described. A method of producing the solid electrolyte material of the present invention includes: a raw material composition preparation step of grinding, mixing, and molding a Li element, an M element (M is at least one selected from the group consisting of Ge, Sb, Si, Sn, B, Al, Ga, In, Zr, V, and Nb), a P element, and a S element to prepare a raw material composition; and a heating step of heating the raw material composition, thereby obtaining a solid electrolyte material.

Figure 3:
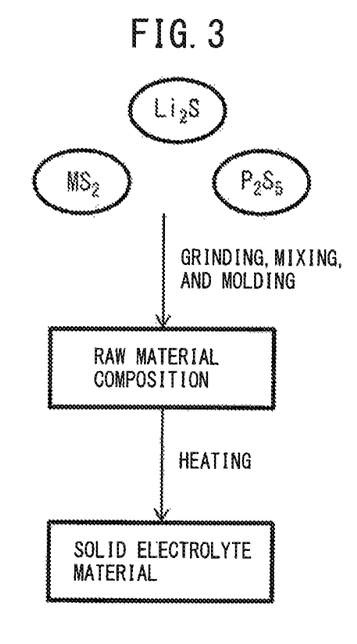
FIG. 3 is an explanatory diagram illustrating an example of a method of producing a sulfide-based solid electrolyte material of the present invention.

FIG. 3 is an explanatory diagram illustrating an example of the method of producing the solid electrolyte material of the present invention. In the method of producing the solid electrolyte material in FIG. 3, first, $Li_2S$, $P_2S$, and $MS_2$ are ground and mixed by a vibration mill or the like and are pelleted to thereby producing a raw material composition. Then, the raw material composition is heated in a vacuum to obtain a solid electrolyte material by s solid phase reaction.

Mechanical milling may be used for the grinding and the mixing. The mechanical milling is a method of grinding a sample while applying mechanical energy thereto. Examples of such mechanical milling include vibration mill, ball mill, turbo mill, mechano-fusion, and disk mill. Especially, vibration mill and ball mill are preferred. The conditions of vibration mill as one example are not particularly limited if the conditions enable a physical object to be ground and mixed. The vibrational amplitude of vibration mill is preferably, for example, within a range of 5 mm to 15 mm, especially, within a range of 6 mm to 10 mm. The vibration frequency of vibration mill is preferably, for example, within a range of 500 rpm to 2000 rpm, especially, within a range of 1000 rpm to 1800 rpm. The filling rate of a sample in vibration mill is preferably, for example, within a range of 1% by volume to 80% by volume, especially, within a range of 5% by volume to 60% by volume, particularly, within a range of 10% by volume to 50% by volume. A vibrator (for example, a vibrator made of alumina) is preferably used for vibration mill.

The heating temperature in the heating step can be adjusted as appropriate depending on a starting material, and is preferably within a range of about 500° C. to 900° C. The heating time includes heating-up time and retention time, each time of which is preferably adjusted as appropriate so as to obtain a desired solid electrolyte material. Each may be allowed to be, for example, within a range of 30 minutes to 10 hours. Further, when cooling is performed to room temperature after the heating, natural cooling may be adopted or annealing may be performed so as to obtain a desired solid electrolyte material.

It is preferable to operate the series of steps under an inert gas atmosphere such as argon in order to prevent the raw material composition and the obtained solid electrolyte material from degrading due to moisture in air.

The sulfide solid electrolyte material of the present invention preferably has a high ion conductivity, and the ion conductivity of the sulfide solid electrolyte material at 25° C. is preferably $7.5 \times 10^{-6}$ S/cm or more, and more preferably $1.0 \times 10^{-5}$ S/cm or more. The form of the sulfide solid electrolyte material of the present invention is not particularly limited, but examples thereof include a powder form. Further, the average particle diameter of the sulfide solid electrolyte material in a powder form is preferably, for example, within a range of 0.1 μm to 50 μm.

The sulfide solid electrolyte material of the present invention has a high ion conductivity and can be therefore used in an optional application in need of ion conductivity. Especially, the sulfide solid electrolyte material of the present invention is preferably used in a battery, because the sulfide solid electrolyte material can greatly contribute to the higher output of the battery.

Figure 4:
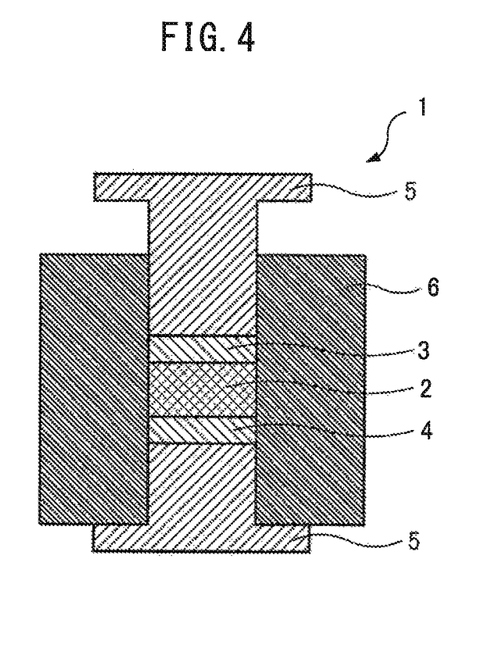
FIG. 4 is a schematic view illustrating a cross section of a lithium battery of the present invention.

The lithium battery of the present invention will be described with reference to FIG. 4. FIG. 4 is a schematic view illustrating a cross section of a lithium battery in an embodiment of the present invention. The lithium battery 1 of the embodiment of the present invention includes a solid electrolyte 2 of the present invention, an anode 3, a cathode 4, a collector 5, and an insulation unit 6. A material used in the anode 3 is not particularly limited as long as being a material conventionally used in the anode of a lithium battery. For example, Li, In, C, or the like can be used as the used in the anode 3. A material used in the cathode 4 is not particularly limited as long as being a material conventionally used in the cathode of a lithium battery. For example, $LiCoO_2$, TiS, $LiMn_2O_4$, or the like can be used as the material used in the cathode 4. Materials used in the collector 5 and the insulation unit 6 are not particularly limited as long as being materials conventionally used in the collector and insulation unit of a lithium battery. For example, stainless steel or the like can be used as the material used in the collector 5, and, for example, polycarbonate or the like can be used as the material used in the insulation unit 6.

Although the lithium battery 1 in the embodiment of the present invention as described above is a bulk-type lithium battery, the lithium battery of the present invention may be a lithium battery formed in a thin film.

EXAMPLES

The present invention will be described in more detail below with reference to examples. The following examples are not intended to limit the present invention.

(Production of $Li_2S$-$MS_2$ ($GeS_2$)—$P_2S_5$-Based Sample)

In a glove box under an argon atmosphere, $Li_2S$, $MS_2$ ($GeS_2$), and $P_2S_5$ as starting materials were weighed to produce a mixed sample by using a vibration mill. The sample was put in a pelleter, and a pressure of 20 MPa was applied to the pelleter by using a uniaxial pressing machine, to mold a pellet having a diameter of 13 mm. The pellet was vacuum-encapsulated in a quartz tube coated with carbon. The temperature of the quartz tube in which the pellet was put was raised to 700° C. for 6 hours (at a temperature-raising rate of 1.89° C./min). Then, the quartz tube was retained for 8 hours and thereafter naturally cooled. The compositions of the synthesized samples are listed in Table 1. Referring to the ternary composition diagram of the $Li_2S$-$MS_2$ ($GeS_2$)—$P_2S_5$ system of FIG. 1, the points "●" indicate the compositions of examples, the points "■" indicate the compositions of comparative examples, and the points "▲" indicate the compositions of the sulfide-based solid ▲ electrolytes described in the above Citation List and the like.

TABLE 1

Compositions of Synthesized Samples
(Based on $Li_2S$—$GeS_2$—$P_2S_5$)

| Sample | Composition | Synthesis Condition |
| --- | --- | --- |
| Example 1 | $Li_5GePS_7$ | Retained at 700° C. for 8 hours |
| Example 2 | $Li_{1.75}Ge_{0.75}P_{0.25}S_3$ | |
| Example 3 | $Li_{5.5}Ge_{1.5}P_{0.5}S_7$ | |
| Example 4 | $Li_{4.1}Ge_{2.6}P_{0.7}S_9$ | |
| Example 5 | $Li_{3.3}Ge_{1.6}P_{0.46}S_6$ | |
| Example 6 | $Li_{6.5}Ge_{2.25}P_{0.5}S_9$ | |
| Example 7 | $Li_{6.41}Ge_{2.36}P_{1.23}S_{11}$ | |
| Example 8 | $Li_{2.52}Ge_{1.395}P_{0.38}S_5$ | |
| Example 9 | $Li_{2.75}Ge_{1.5}P_{0.25}S_5$ | |
| Example 10 | $Li_{1.875}Ge_{0.875}P_{0.125}S_3$ | |
| Example 11 | $Li_{1.625}Ge_{0.625}P_{0.375}S_3$ | |
| Example 12 | $Li_{4.58}Ge_{2.28}P_{0.86}S_9$ | |
| Example 13 | $Li_{5.7}Ge_2P_{0.86}S_9$ | |
| Example 14 | $Li_{6.31}Ge_{2.31}P_{0.69}S_{9.5}$ | |
| Example 15 | $Li_{4.1}Ge_{2.6}P_{0.7}S_9$ | |
| Example 16 | $Li_{3.85}Ge_{1.35}P_{0.55}S_6$ | |
| Example 17 | $Li_{4.625}Ge_{1.875}P_{0.375}S_7$ | |
| Example 18 | $Li_{5.8}Ge_{2.25}P_{1.2}S_{11}$ | |
| Example 19 | $Li_{6.24}Ge_{3.04}P_{0.72}S_{11}$ | |
| Example 20 | $Li_{3.75}Ge_{1.3925}P_{0.536}S_6$ | |
| Example 21 | $Li_{3.25}Ge_{1.6075}P_{0.464}S_6$ | |
| Comparative Example 22 | $Li_{1.5}Ge_{0.5}P_{0.5}S_3$ | |
| Comparative Example 23 | $Li_{5.75}Ge_{0.75}P_{2.25}S_{10}$ | |
| Comparative Example 24 | $Li_7Ge_{0.5}P_3S_{12}$ | |
| Comparative Example 25 | $Li_5GeP_3S_{12}$ | |
| Comparative Example 26 | $Li_3Ge_{1.5}P_3S_{12}$ | |

(Powder X-Ray Diffraction Measurement)

Powder X-ray diffraction measurement was performed using powder X-ray diffractometers Ulima-IV (manufactured by Rigaku Corporation) and Smart Lab (manufactured by Rigaku Corporation) in order to identify crystals included in the produced samples. A Cu-Kα ray having an X-ray wavelength of 1.5418 Å was used in the powder X-ray diffraction measurement. The powder X-ray diffraction measurement was performed at diffraction angles (2θ) in a range of 10 to 100°.

(Measurement of Conductivity)

The ground sample was put in a cell for ordinary temperature, and a pressure of 5 MPa was then applied to the cell for ordinary temperature to produce a pellet. A gold powder was dispersed on both surfaces of the pellet, and a pressure of 15 MPa was applied to the pellet to form electrodes on both surfaces of the pellet and to produce a test sample. An impedance gain phase analyzer Solatron 1260 (manufactured by Solartron) was used in measurement of the conductivity of the test sample. An alternating-current impedance was measured under conditions of a measurement range of 1 Hz to 10 MHz, a measurement temperature of 25° C., an alternating voltage of 50 to 100 mV, and an integration time of 2 seconds, to measure the conductivity of the sample.

(Measurement of Thermal Stability)

Differential calorimetry was performed using a differential type differential thermal balance Thermo Plus EVO II TG8120 (manufactured by Rigaku Corporation) in order to examine the thermal stability of the sample. Among the compositions of the $Li_2S$-$MS_2$ ($GeS_2$)—$P_2S_5$ system in Table 1, $Li_{1.75}Ge_{0.75}P_{0.25}S_3$ (Example 2) of which the characteristic peaks of the argyrodite type phase were able to be distinctly discriminated as a result of X-ray diffraction measurement described later was adopted as a composition as a base. Conditions for obtaining a solid electrolyte material were set to the same conditions as the conditions in the production of the $Li_2S$-$MS_2$ ($GeS_2$)—$P_2S_5$-based sample described above except that in the heating step, the temperature was raised to 870° C. or 530° C. for 3 hours, followed by retention for 3 hours. A sample was prepared for measuring thermal stability in a glove box under an argon atmosphere. In an SUS pan, 10 mg of the ground sample was put, and encapsulated at 10 MPa to produce a test sample. In an SUS pan, $Al_2O_3$ was put, and encapsulated at 10 MPa to produce a reference sample. Differential calorimetry was performed by raising the temperature of the test sample from room temperature to 900° C. at a temperature-raising rate of 5° C. to 20° C./min.

(Production of $Li_2S$-$MS_2$ ((Sn, Si)$S_2$)—$P_2S_5$-Based Sample)

In the compositions of Table 1, Ge was used as an element M in the compositions. A sample was produced using Sn and Si instead of Ge as the element M. Among the compositions of the $Li_2S$-$MS_2$ ($GeS_2$)—$P_2S_5$ system in Table 1, $Li_{1.75}Ge_{0.75}P_{0.25}S_3$ (Example 2) of which the characteristic peaks of the argyrodite type phase were able to be distinctly discriminated as a result of X-ray diffraction measurement described later was adopted as a composition as a base. A procedure of producing the sample was the same as described above except that Ge as a starting material was changed to Sn and Si. The contents of Sn and Si were adjusted so that β=0.2 or 0.3 is satisfied, and α is in a range of 0 to 0.4 in a composition formula: $Li_{3.45-4\alpha+\beta}(Sn_{0.09+\alpha}Si_{0.36+\beta})P_{0.55-\beta}S_4$. Referring to a ternary composition diagram of a $Li_2S$-$MS_2$ ((Sn, Si)$S_2$)—$P_2S_5$ system of FIG. 5, the points "◊" indicate compositions on the line of β=0.2, and in particular, the point "◆" indicates a composition of α=0.4. The points "∇" indicate compositions on the line of β=0.3, and in particular, the point "▼" indicates a composition of α=0.4. The point "*" indicates the composition of $Li_{1.75}Ge_{0.75}P_{0.25}S_3$ (Example 2).

[Evaluation]

(X-Ray Diffraction Measurement)

X-ray diffraction (XRD) measurement was performed using the sulfide solid electrolyte material obtained in Example 2. The results are illustrated in FIG. 2. The upper line in FIG. 2 indicates an XRD pattern obtained by measuring $Li_{1.75}Ge_{0.75}P_{0.25}S_3$ in Example 2 with a CuKα ray, while the lower line in FIG. 2 indicates an XRD pattern obtained by measuring $Li_7PS_6$ for a comparison. As illustrated in FIG. 2, the sulfide solid electrolyte material having an approximately single phase was obtained in Example 2. The diffraction pattern of the phase was similar to that of the high temperature phase of $Li_7PS_6$ for the comparison and suggested an argyrodite structure. The positions of peaks were at 2θ=15.9°, 18.3°, 25.9°, 30.4°, 31.8°, 40.3°, 41.3°, 45.5°, and 48.4°. The peaks are considered to be the peaks of an argyrodite phase with high Li ion conductivity. The positions of the peaks described above may fall within a range of ±0.50° (especially ±0.30°).

Figure 6:
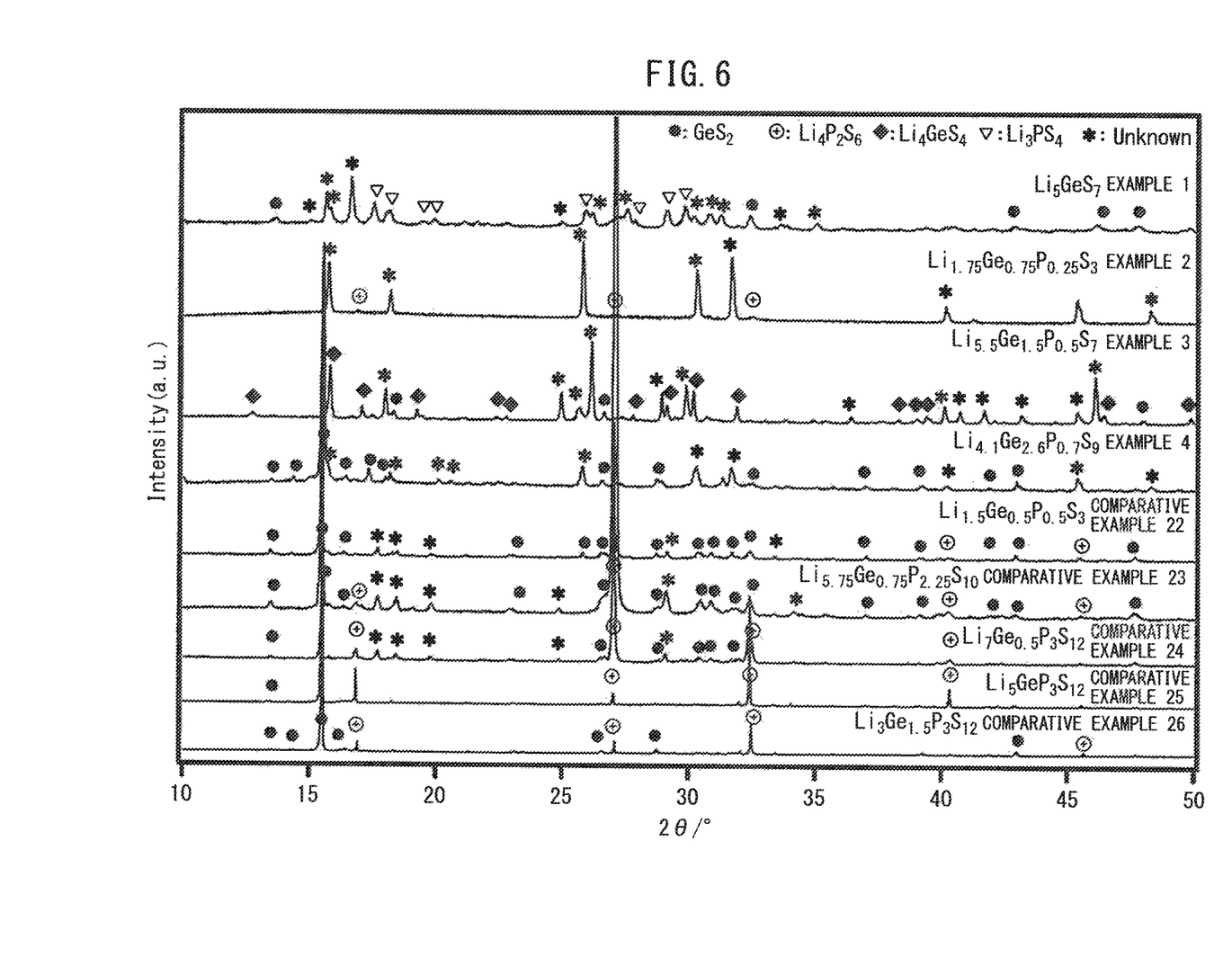
FIG. 6 illustrates the X-ray diffraction patterns of sulfide-based solid electrolytes of the present invention.

Then, X-ray diffraction measurement (using a CuKα ray) was performed using the sulfide solid electrolyte materials obtained in Examples 1 to 4 and the samples for comparisons obtained in Comparative Examples 22 to 26. The results are illustrated in FIG. 6. As illustrated in FIG. 6, an argyrodite type phase was also observed in the composition of $Li_{4.1}Ge_{2.6}P_{0.7}S_9$ (Example 4). However, a reflection that was able to belong to germanium sulfide as a raw material was observed in the $Li_{4.1}Ge_{2.6}P_{0.7}S_9$ (Example 4) system. Reflections that were able to belong to known phases were also observed in the compositions of the other Examples. As an example, a reflection that was able to belong to $Li_3PS_4$ was observed in $Li_5GePS_7$ (Example 1) having a composition relatively similar to the composition of a high ion conductive phase LGPS present on the $Li_4GeS_4$—$Li_3PS_4$ solid-solution system. In addition, several unknown reflections were observed in the samples of Examples. As an example, unknown strong reflections were observed in the vicinities of 25° and 45° in the $Li_{5.5}Ge_{1.5}P_{0.5}S_7$ (Example 3) system and suggested the presence of a new phase different from the argyrodite phase and the LGPS phase.

In contrast, in the samples of Comparative Examples 22 to 26, any peaks of the argyrodite type phase and the LGPS phase were not observed, and many reflections that were able to belong to other known impurities were observed. The solid electrolyte material within the composition range of the present invention includes an argyrodite type phase, an LGPS phase, and/or an unknown phase, and the inclusion of the phases is considered to contribute to performance such as excellent ion conductivity.

(Measurement of Li Ion Conductivity)

Li ion conductivities at 25° C. were measured using the sulfide solid electrolyte materials obtained in Examples 1 to 4 and the samples for comparisons obtained in Comparative Examples 22 to 24. The results of the measured conductivities of the solid electrolytes are listed in Table 2.

TABLE 2

Results of Measured Ion Conductivities

| Sample | Composition | Ion Conductivity (S/cm) |
| --- | --- | --- |
| Example 1 | $Li_5GePS_7$ | $6.6 \times 10^{-5}$ |
| Example 2 | $Li_{1.75}Ge_{0.75}P_{0.25}S_3$ | $2.1 \times 10^{-5}$ |

TABLE 2-continued

Results of Measured Ion Conductivities

| Sample | Composition | Ion Conductivity (S/cm) |
|---|---|---|
| Example 3 | $Li_{5.5}Ge_{1.5}P_{0.5}S_7$ | $1.5 \times 10^{-5}$ |
| Example 4 | $Li_{4.1}Ge_{2.6}P_{0.7}S_9$ | $7.5 \times 10^{-6}$ |
| Comparative Example 22 | $Li_{1.5}Ge_{0.5}P_{0.5}S_3$ | $1.5 \times 10^{-7}$ |
| Comparative Example 23 | $Li_{5.75}Ge_{0.75}P_{2.25}S_{10}$ | $6.3 \times 10^{-8}$ |
| Comparative Example 24 | $Li_7Ge_{0.5}P_3S_{12}$ | $1.1 \times 10^{-7}$ |

The $Li_5GePS_7$ system (Example 1) exhibited the highest ion conductivity, $6.6 \times 10^{-5}$ S cm$^{-1}$, followed by the $Li_{1.75}Ge_{0.75}P_{0.25}S_3$ system (Example 2) exhibiting $2.1 \times 10^{-5}$ S cm$^{-1}$. In Example 1, the LGPS phase ($Li_3PS_4$) is considered to contribute to high ion conductivity. The $Li_{4.1}Ge_{2.6}P_{0.7}S_9$ system including an argyrodite phase (Example 4) exhibited an ion conductivity of $7.5 \times 10^{-6}$ S cm$^{-1}$. The $Li_{4.1}Ge_{2.6}P_{0.7}S_9$ system was considered to have the ion conductivity that was lower than the ion conductivity in Example 2 in which the argyrodite phase was obtained as an approximately single phase because the system included germanium sulfide with insulating properties as an impurity. The $Li_{5.5}Ge_{1.5}P_{0.5}S_7$ system (Example 3) exhibited an ion conductivity of $1.5 \times 10^{-5}$ S cm$^{-1}$. In Example 3, not only known substances but also plural unknown reflections were observed in the powder X-ray diffraction pattern, suggesting a complicated system; however, relatively high ion conductivity was exhibited. The compositions of Comparative Examples exhibited relatively low ionic conductivity ($<10^{-7}$ S cm$^{-1}$). This is considered to be because impurities included in the compositions of Comparative Examples were more than those in Examples.

(Measurement of Thermal Stability)

In $Li_{1.75}Ge_{0.75}P_{0.25}S_3$ synthesized at 700° C. (Example 2), the characteristic peaks of an argyrodite type phase were able to be distinctly discriminated as a result of the X-ray diffraction measurement. A solid electrolyte material was synthesized at a synthesis temperature of 870° C. while the composition ratio was maintained. The temperature of the obtained solid electrolyte material was raised from room temperature to 900° C., and the differential thermal analysis (DTA) of the solid electrolyte material was performed. As a result, an exothermic peak was observed in the vicinity of 500° C., and an endothermic peak was observed in the vicinity of 550° C. Since a change of a temperature-raising rate at 5 to 20° C./min resulted in a change in temperature at which the exothermic peak occurred but in no change in temperature at which the endothermic peak occurred, the exothermic peak and the endothermic peak were considered to result from the stabilization of the phase and the fusion of the sample, respectively. On the basis of the results, the argyrodite type phase is considered to be a metastable phase.

On the basis of the results of the differential thermal analysis, a solid electrolyte material was synthesized at 530° C. to attempt to obtain the stable phase of a system. Further, the result of an ion conductivity measured according to each synthesis condition (heating temperature) of the solid electrolyte material is listed in Table 3. The solid electrolyte material with the stable phase had ion conductivity superior to the ion conductivity of the solid electrolyte material with the metastable phase.

TABLE 3

Synthesis Condition (Heating Temperature) of Solid Electrolyte Material and Result of Measured Ion Conductivity

| Composition | Synthesis Condition | Ion Conductivity (S/cm) |
|---|---|---|
| $Li_{1.75}Ge_{0.75}P_{0.25}S_3$ | 700° C. | $2.1 \times 10^{-5}$ |
| | 870° C. | $2.5 \times 10^{-5}$ |
| | 530° C. | $3.2 \times 10^{-4}$ |

(Production of $Li_2S$-$MS_2$ ((Sn, Si)$S_2$)—$P_2S_5$-Based Sample)

A solid electrolyte material was produced using Sn and Si as elements M in a composition. In a composition formula: $Li_{3.45-4\alpha+\beta}(Sn_{0.09+\alpha}Si_{0.36+\beta})P_{0.55-\beta}S_4$, $\beta=0.2$ or 0.3 is satisfied, and $\alpha$ is in a range of 0 to 0.4. Referring to the ternary composition diagram of the $Li_2S$-$MS_2$ ((Sn, Si)$S_2$)—$P_2S_5$ system of FIG. 5, the points "◇" indicate compositions on the line of $\beta=0.2$, and in particular, the point "◆" indicates a composition of $\alpha=0.4$. The points "▽" indicate compositions on the line of $\beta=0.3$, and in particular, the point "▼" indicates a composition of $\alpha=0.4$. The point "*" indicates the composition of $Li_{1.75}Ge_{0.75}P_{0.25}S_3$ (Example 2) as a base.

The X-ray diffraction and Li ion conductivity of the produced solid electrolyte material including Sn and Si were measured under the same conditions as the conditions described above. The results are illustrated in FIG. 7.

Figure 5:
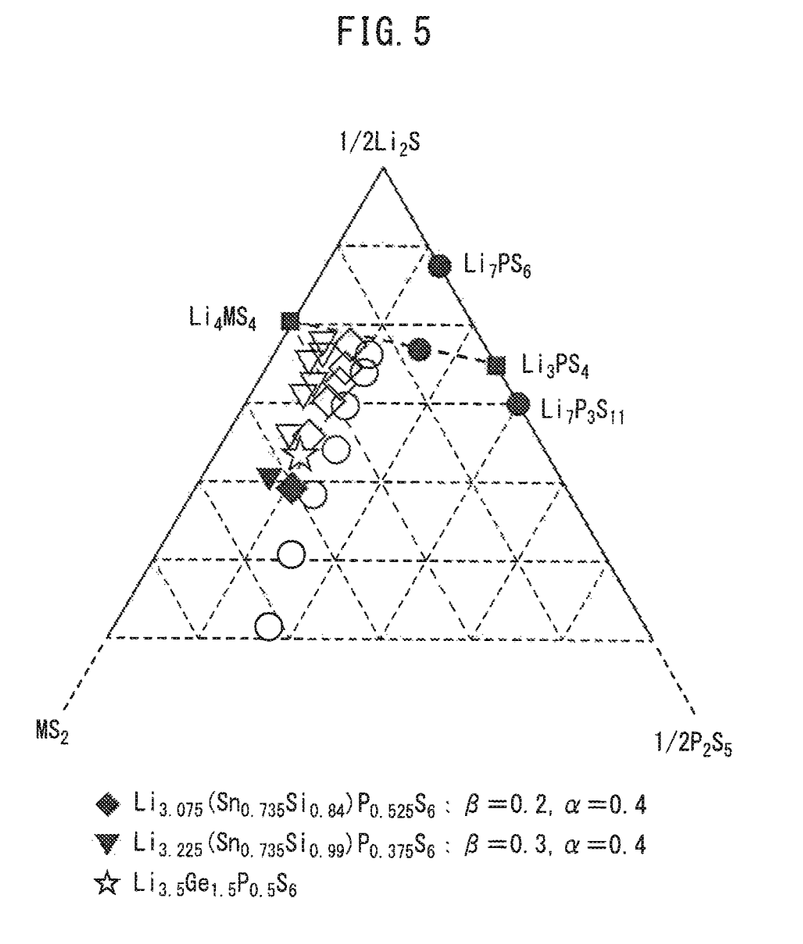
FIG. 5 is a ternary composition diagram of an $Li_2S$-$MS_2$ ((Sn, Si)$S_2$)—$P_2S_5$ system illustrating the composition range of a sulfide-based solid electrolyte of the present invention.
Figure 7:
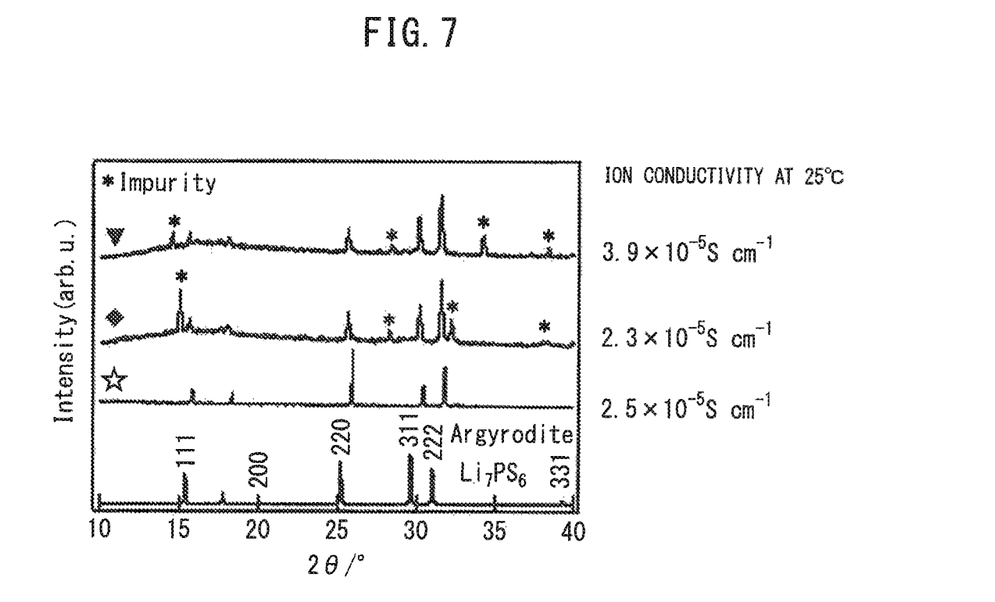
FIG. 7 illustrates the results of measurement of the X-ray diffraction and Li ion conductivity of a sulfide-based solid electrolyte material including Sn and Si of the present invention.

The compositions of samples illustrated in FIG. 7 are as follows:

$Li_{3.075}(Sn_{0.735}Si_{0.84})P_{0.525}S_6$ (corresponding to "◆" in FIG. 5);

$Li_{3.225}(Sn_{0.735}Si_{0.99})P_{0.375}S_6$ (corresponding to "▼" in FIG. 5);

$Li_{1.75}Ge_{0.75}P_{0.25}S_3$ (Example 2) as a base (corresponding to "*" in FIG. 5); and $Li_7PS_6$ as a reference sample for an argyrodite phase.

It was confirmed based on the results of the X-ray diffraction measurement that the solid electrolyte materials including Sn and Si also included argyrodite phases. In addition, the argyrodite phases were formed in the solid electrolyte materials "◆" and "▼" in which the contents of Li in the compositions were less than that in the Ge-based material "*" as the base. The ion conductivities of the solid electrolyte materials were confirmed to be equivalent to the ion conductivity of the Ge-based material.

REFERENCE SIGNS LIST

1 Lithium battery
2 Solid electrolyte
3 Anode
4 Cathode
5 Collector
6 Insulation unit

The invention claimed is:

1. A solid electrolyte comprising a sulfide-based solid electrolyte represented by a composition formula: $(Li_2S)_x(MS_2)_y(P_2S_5)_z$, wherein
   M is at least one selected from the group consisting of Ge, Sb, Si, Sn, B, Al, Ga, In, Zr, V, and Nb; and
   $0.53 \leq x \leq 0.74$, $0.13 \leq y \leq 0.37$, $0.04 \leq z \leq 0.15$, and $x+y+z=1$ are satisfied.

2. The solid electrolyte according to claim 1, wherein at least some of the sulfide-based solid electrolytes comprise characteristic peaks at at least diffraction angles (2θ) in vicinities of 15.9°, 18.3°, 25.9°, 30.4°, 31.8°, 40.3°, 41.3°, 45.5°, and 48.4° in powder X-ray diffractometry with a Cu-Kα ray having an X-ray wavelength of 1.5418 Å.

3. A lithium battery comprising the solid electrolyte according to claim 1.

4. A lithium battery comprising the solid electrolyte according to claim 2.

* * * * *